INVENTOR
Alfred F. Bauer

July 7, 1959 — A. F. BAUER — 2,893,358
DIE CAST V-TYPE ENGINE BLOCK
Filed Jan. 16, 1958 — 10 Sheets-Sheet 4
Fig. 5.
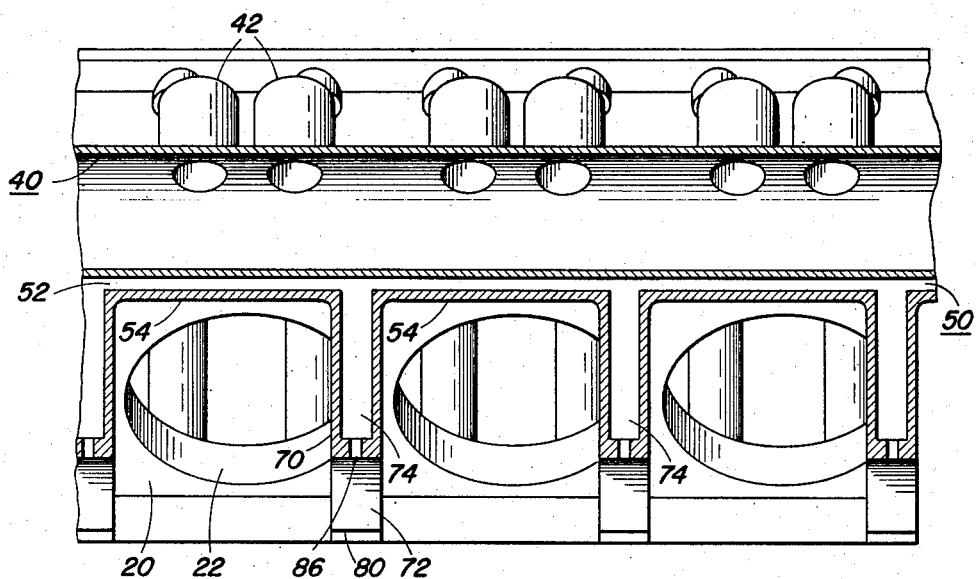
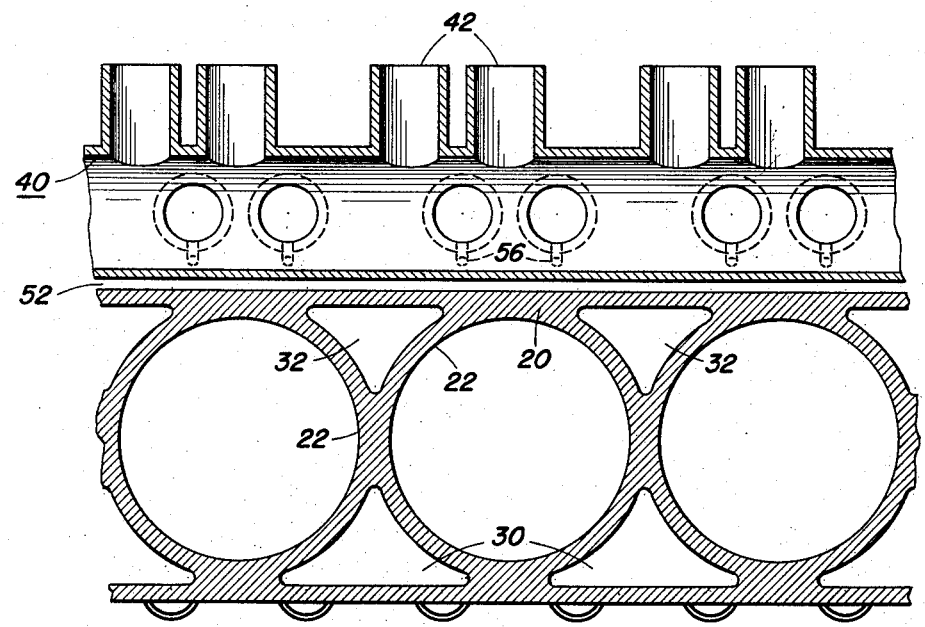
Fig. 6.
INVENTOR
Alfred F. Bauer
BY
Charles F. Kaegebehn
ATTORNEY July 7, 1959

A. F. BAUER 2,893,358

DIE CAST V-TYPE ENGINE BLOCK

Filed Jan. 16, 1958

INVENTOR
Alfred F. Bauer
BY
ATTORNEY

July 7, 1959 A. F. BAUER 2,893,358
DIE CAST V-TYPE ENGINE BLOCK
Filed Jan. 16, 1958 10 Sheets-Sheet 8

INVENTOR
Alfred F. Bauer
BY
ATTORNEY

July 7, 1959

A. F. BAUER 2,893,358

DIE CAST V-TYPE ENGINE BLOCK

Filed Jan. 16, 1958

INVENTOR
Alfred F. Bauer

BY

ATTORNEY

INVENTOR
Alfred F. Bauer
BY
*Charles F. Kargebel*
ATTORNEY

United States Patent Office 2,893,358
Patented July 7, 1959

2,893,358

DIE CAST V-TYPE ENGINE BLOCK

Alfred F. Bauer, Toledo, Ohio, assignor to National Lead Company, New York, N.Y., a corporation of New Jersey Application January 16, 1958, Serial No. 709,299

7 Claims. (Cl. 121—194)

This invention relates to engine blocks for internal combustion engines of the V-type and more particularly to an improved form of construction whereby such engine blocks may be fabricated of light weight alloys such as aluminum by the process of pressure die casting.

Engine blocks for commercial V-type internal combustion engines are currently being produced by the sand-casting method. The engine blocks thus produced possess certain undesirable features, some of which are inherent to the method of casting.

Some of the undesirable features are roughness of the coolant gallery due to the sand cores; lack of uniformity of cylinder walls and coolant channels caused by the shifting of the sand cores; the necessity for using caps or plugs to seal holes through which, during casting, extended support rods for the internal cores; the great amount of machining required to obtain uniformity of size; and the impossibility of coring small holes or passages. Also great care must be exercised in the cleaning of these sand castings so that all the sand and scale are removed from the interior of the block, otherwise clogged coolant lines may result.

In present-day engines the crankshaft and camshaft bearings and valve tappets are usually lubricated by means of tributary oil holes which are branches of one or more main oil holes extending longitudinally through the engine block. These small tributary holes, which in present blocks must be drilled, are subject to clogging by sludge from the lubricant or even scale from an improperly cleaned casting. Such clogging results in inadequate lubrication of these vital parts along with the accompanying excessive wear.

With the current trend to higher octane fuel and more powerful engines, one of the weak spots of the engine block is felt to be the wall between the crankshaft and the cylinders. These walls are subjected to enormous strains each time a charge of fuel is ignited in a cylinder and with more efficient design of the cylinder, cylinder head and piston, to extract more power from the ignition of each charge of fuel, the strains and stresses will increase even more.

It is, therefore, an object of this invention to provide an improved form of construction for a V-type engine block which has no undercuts, projections or blind passages so that the said engine block may be easily fabricated by the method of pressure die casting.

A further object of this invention is to provide an engine block in which lubricant and coolant passages are cast directly into the block providing smooth, uniform passageways which will permit free, unobstructed flow of the respective fluids.

Another object of this invention is to provide an improved form of engine block with a longitudinal lubricant passage, enclosed on the underneath side by a section of the engine block casting and enclosed on the upper side by a section of a separate casting, which obviates the necessity for drilling or the use of long cores for its formation.

A still further object of this invention is to provide an engine block of such configuration as to afford, by means of double-wall construction, walls and bearing supports of greater strength and rigidity while adding no more weight to the casting.

These and other objects of this invention will become apparent from the following more complete description of the engine block and the drawings in which:

Fig. 5 is a fragmentary longitudinal section along the plane 5—5 of Fig. 2.

Fig. 6 is a fragmentary section along the plane 6—6 of Fig. 2.

The engine block comprises four main sections, the cylinder gallery, camshaft housing, oil gallery and crankcase.

Figure 14:
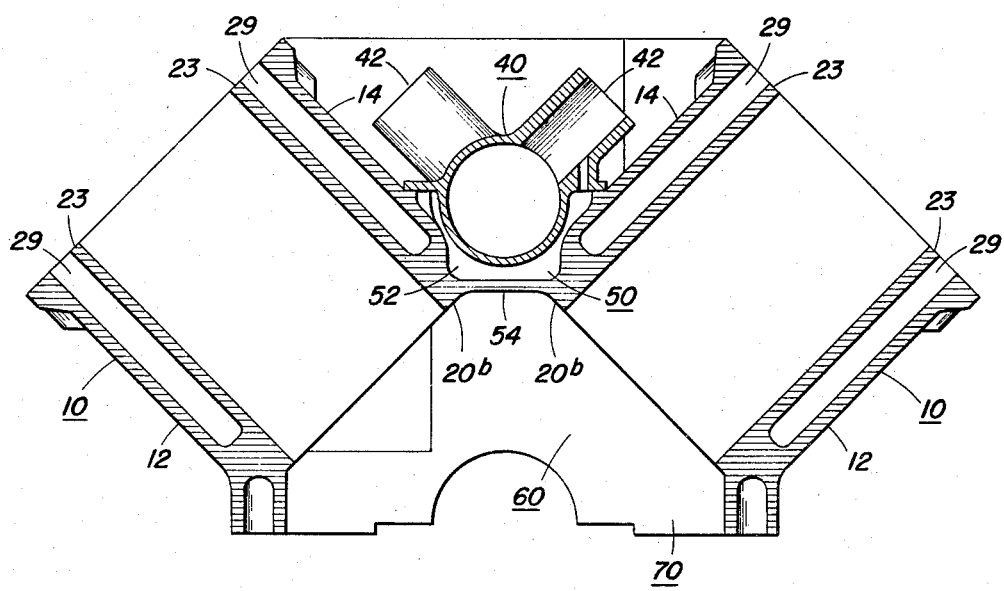
Fig. 14 is a transverse sectional view, similar to Fig. 2, of an engine block having the individual cylinders cast as an integral part of the engine block.
Figure 15:
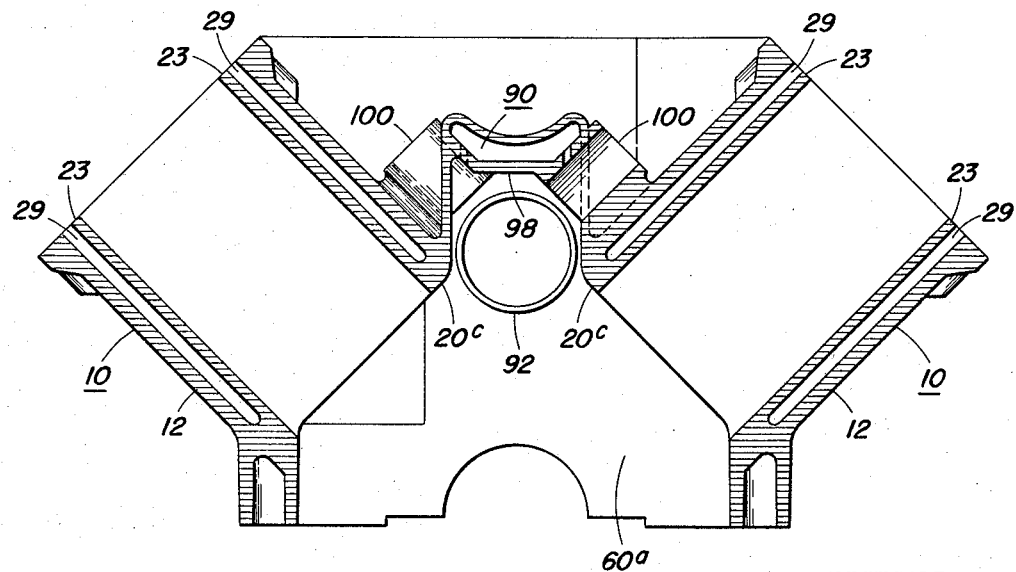
Fig. 15 is a transverse sectional view, similar to Fig. 10, of an engine block having integrally cast cylinders.

The cylinder galleries of this engine block may have either of two general forms. In the one form, as shown in Figs. 14 and 15, the cylindrical walls for the individual cylinders are cast as an integral part of the engine block. In the second and preferred form, the individual cylinder walls are of a different material, usually a ferrous metal, and are inserted at assembly as separate sleeves. The lower ends of these sleeves nest in cylindrical receptors provided in the base plate of the cylinder gallery. The cylinder sleeves in each bank of cylinders may be joined at their upper ends to a common deck plate which would be mounted between the outer ends of the cylinder gallery walls and the cylinder head or each sleeve may be inserted as an individual piece in which case the upper end would be located and held in place by the cylinder head. The renovation of an engine having scored cylinder walls or one having cylinder walls which are worn out-of-round is more economical if the cylinder walls are in the form of separate sleeves since the damaged sleeve may easily be removed and replaced by new ones. The selection of either of these forms is largely a matter of choice and does not affect the novel features of the instant engine block as hereinafter described.

The engine block having the cylinder walls separate from the block itself, being the preferred form, is more fully described and is shown in Figs. 1–13.

The cylinder galleries 10 are obliquely disposed with respect to a plane extending through the centers of the crankshaft and camshaft bearings. Each cylinder gallery is encompassed by the end walls, outside wall 12, inside wall 14 and base plate 20. The said walls are integrally cast with each other and with the base plate and contain corrugations 16 which serve as stiffening members for the walls. The walls terminate at their outer ends in end faces 34 which are machined to form a sealing surface for a deck plate which supports the upper ends of the cylinder sleeves. Adjacent to end faces 34 are a series of bolt lugs 24 by means of which the deck plate and cylinder head are removably attached to the block. With the deck plate and cylinder sleeves in place, a coolant chamber is formed around each cylinder with communicating openings into the cylinder heads for circulation of the coolant.

The base plate 20 is provided with receptors 22 which are cylindrical shaped openings extending through the said base plate and provide a nesting place for the lower ends of the cylinder sleeves. These receptors may be of such configuration as to provide a press-fit for the cylinder sleeves or they may be threaded or provided with some other means for fastening the said sleeves. In the preferred form shown in the drawings, the said receptors provide a sliding fit for floating sleeves which contain O rings or other suitable means for sealing to prevent the leakage of coolant into the crankcase. The base plate also contains recesses 30 and 32 which strengthen this base plate member, provide additional coolant space around the cylinders and prevent the occurrence of heavy metal sections at these locations.

The camshaft housing 40 is a separately cast piece of generally tubular configuration having a flange 46 adapted for fastening to seating surface 26 by bolts 48 which are screwed into bolt lugs 28. This housing may be cast with bearing inserts in the desired locations or the interior of the housing may be machined and the inserts pressed into place. Extending obliquely from the camshaft housing are two rows of valve-tappet ports 42 which are arranged in pairs with one pair being adjacent to each cylinder.

In place of the longitudinal oil holes normally found in engine blocks for supplying lubrication for the valve tappets, camshaft bearings and crankshaft bearings, the present invention incorporates an oil gallery for the direct lubrication of these vital spots. This oil gallery 50 is formed by the camshaft housing covering the oil channel 52, said oil channel being located between the obliquely disposed cylinder galleries and having a bottom member 54 which is cast integral with and extends longitudinally between said cylinder galleries. The said oil channel being cast directly as part of the engine block requires no drilling or other machining such as is necessary to form the conventional oil holes. The valve tappets are lubricated directly from said oil gallery through oil passages 56 which are cast into said housing. The camshaft bearings may be lubricated by oil flowing into the housing from the valve pusher ports or through oil passages which may be provided in the bearing supports.

The crankcase section 60 is beneath and between the cylinder galleries having the sides formed by side wall extensions 62 and the ends by the engine block and walls. The roof of this crankcase section is formed by the base plate of the cylinder galleries and the bottom member 54 of the longitudinal oil channel. The side wall extension 62 is of general double-wall construction with recess 64 formed between the outer and inner walls and having interspersed along the length of the extension integrally cast bolt lugs 85 by means of which the oil pan is attached to the crankcase.

Extending transversely across the crankcase section and cast as an integral part thereof are intermediate walls 70. These intermediate walls strengthen the engine block and support the crankshaft by means of bearing supports 72 and bearing caps which fit into cap sockets 80 and are held in place by fastening bolts which are threaded into bolt holes 84. These intermediate walls also are of general double-wall construction having cavity 76 extending into the wall from the underneath edge and having an oil pocket 74 formed above each of said bearing supports. The effect of the cavities and oil pocket is to provide two walls joined by integrally cast webs 78 which afford the necessary strength and rigidity with no excess weight. The said intermediate walls are formed with recesses 82 directly beneath the cylinder receptors, said recesses facilitating machining of said receptors and providing clearance for the insertion of the piston.

The crankshaft bearings are lubricated by means of oil holes 86 from oil pocket 74, said oil pocket being in direct communication with oil gallery 50. In this manner all bearings and valve tappets are lubricated by means of the longitudinal oil gallery and its tributary members all of which are cast directly into the engine block, eliminating the necessity for drilling or otherwise machining long, narrow oil holes.

Figure 1:
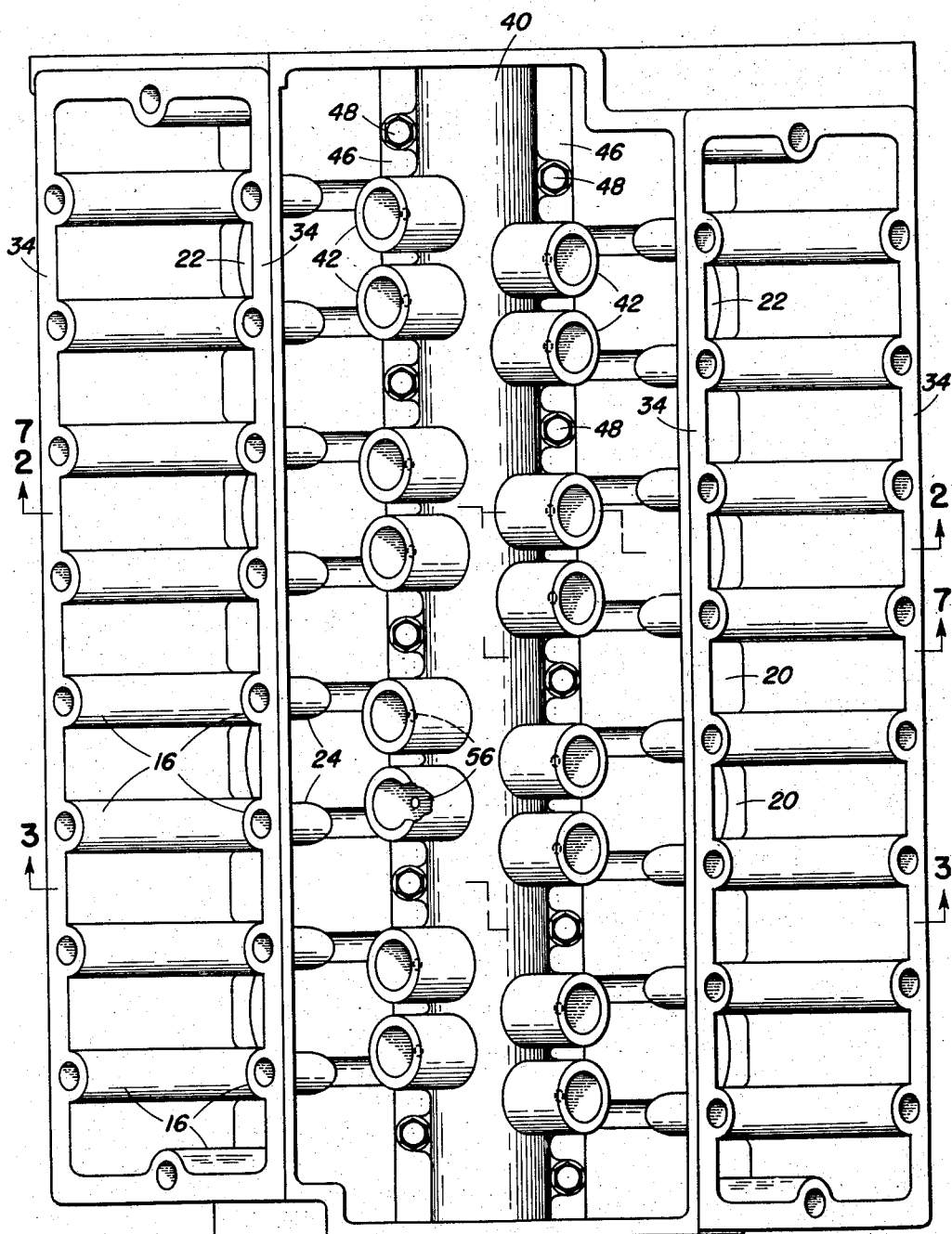
Fig. 1 is a top view of a typical engine block in which the cylinder galleries are provided with receptors for the insertion of individual cylinders in the form of separate sleeves.
Figure 2:
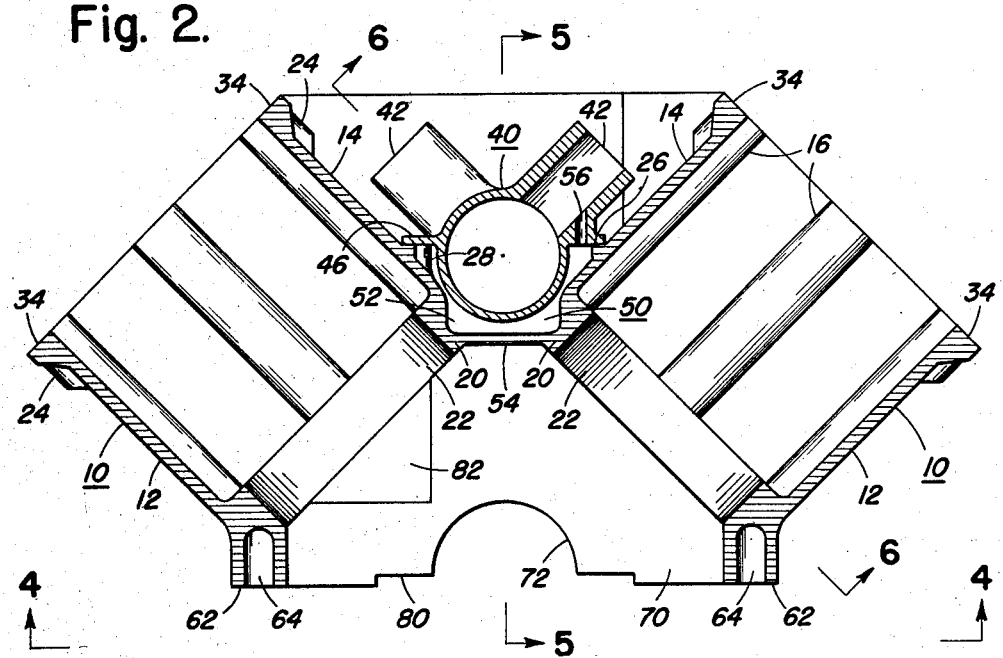
Fig. 2 is a transverse sectional view along the line 2—2 of Fig. 1 through the center of a cylinder in each gallery.
Figure 3:
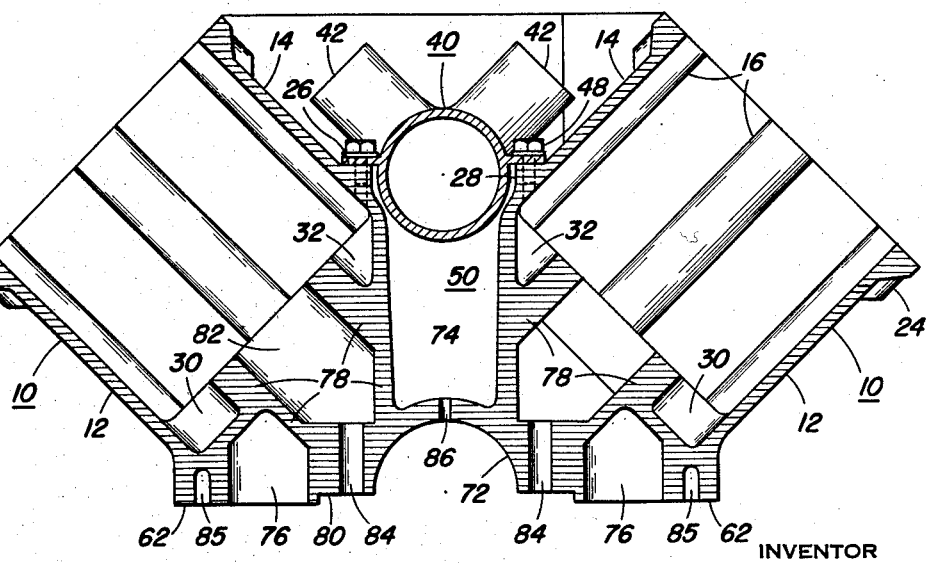
Fig. 3 is a transverse sectional view along the line 3—3 of Fig. 1 between adjacent cylinders in each gallery.
Figure 4:
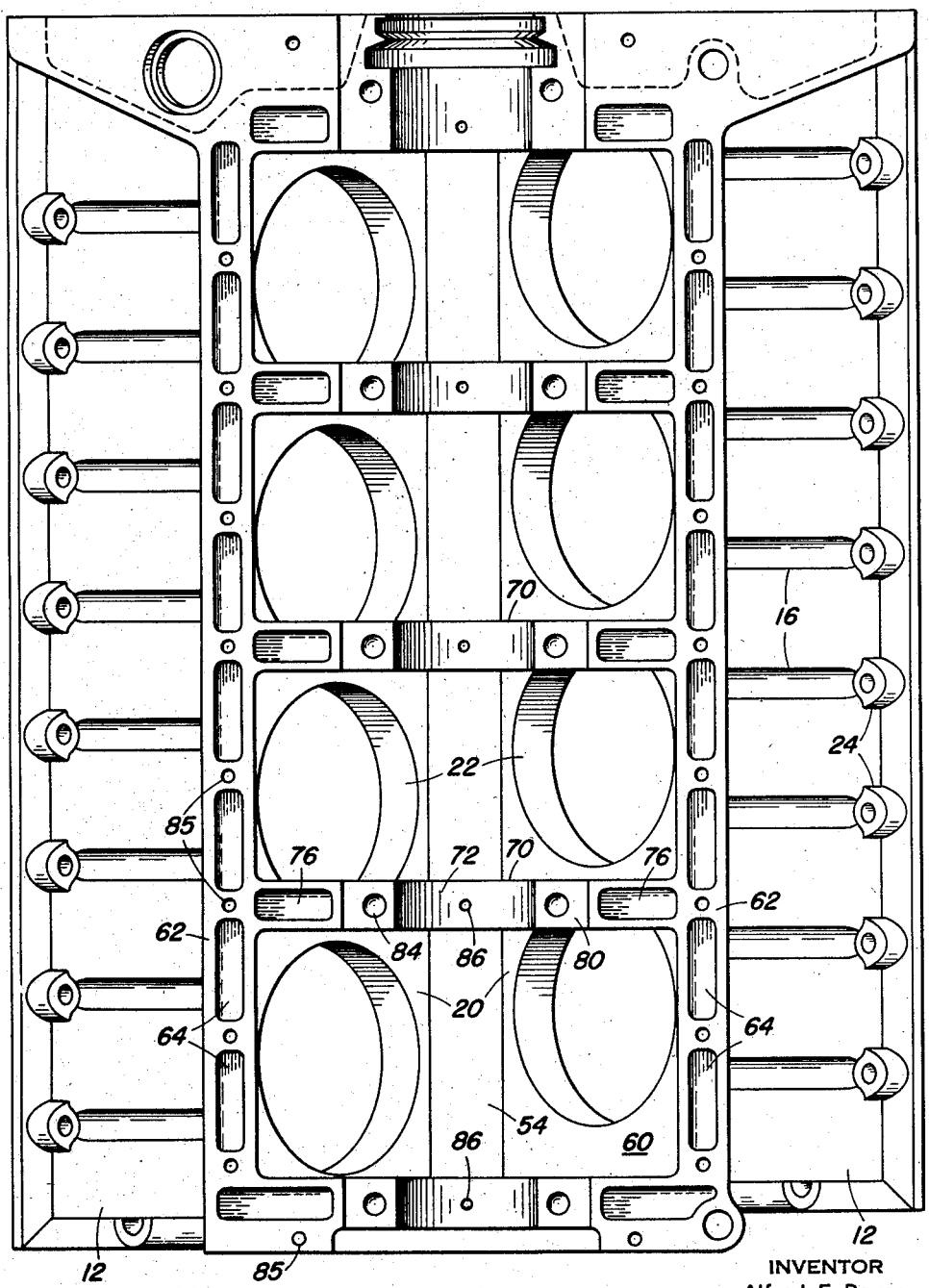
Fig. 4 is a plan view of the underneath side of the engine block along line 4—4 of Fig. 2.
Figure 7:
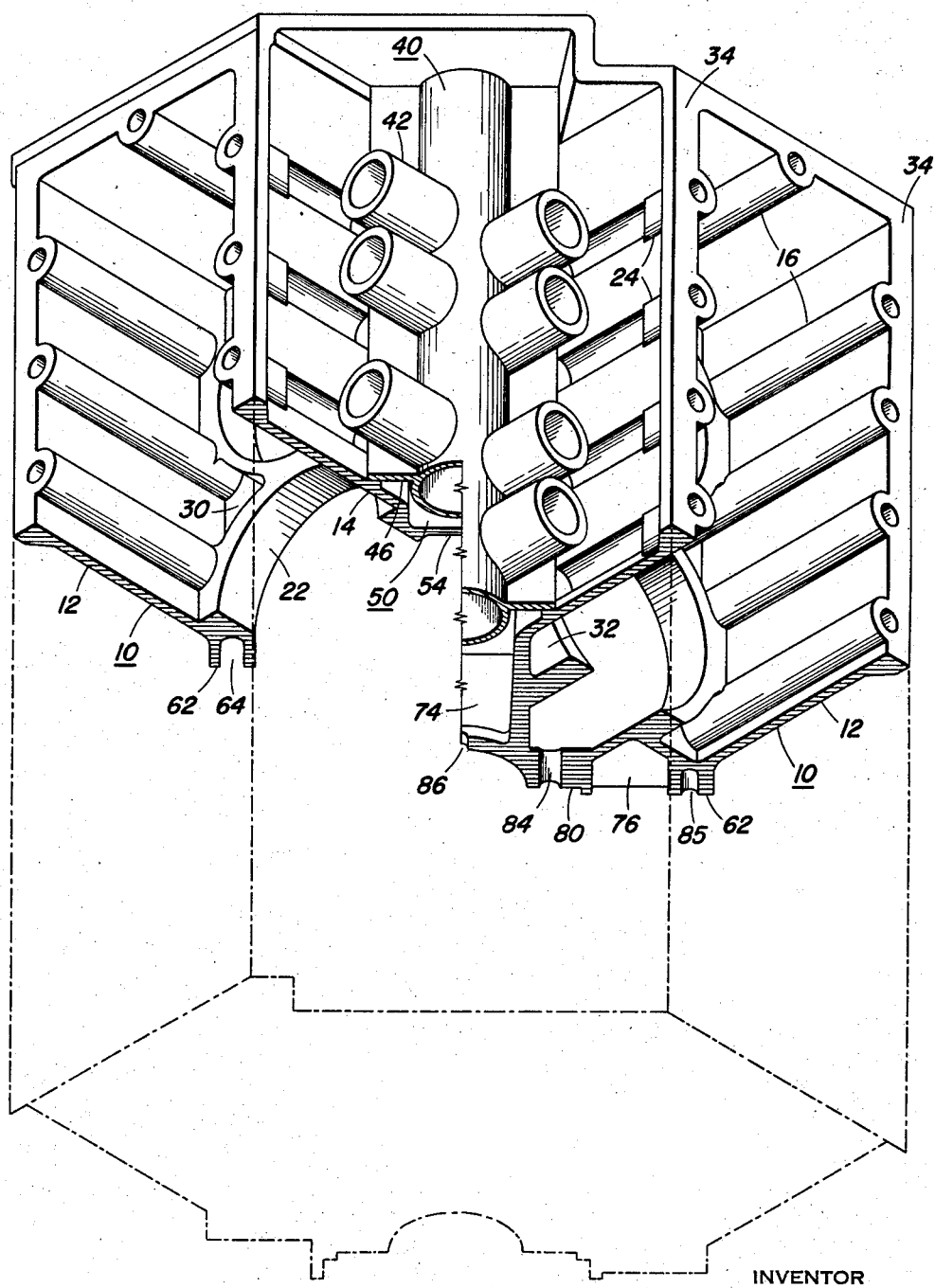
Fig. 7 is a fragmentary perspective view along the line 7—7 of Fig. 1.
Figure 8:
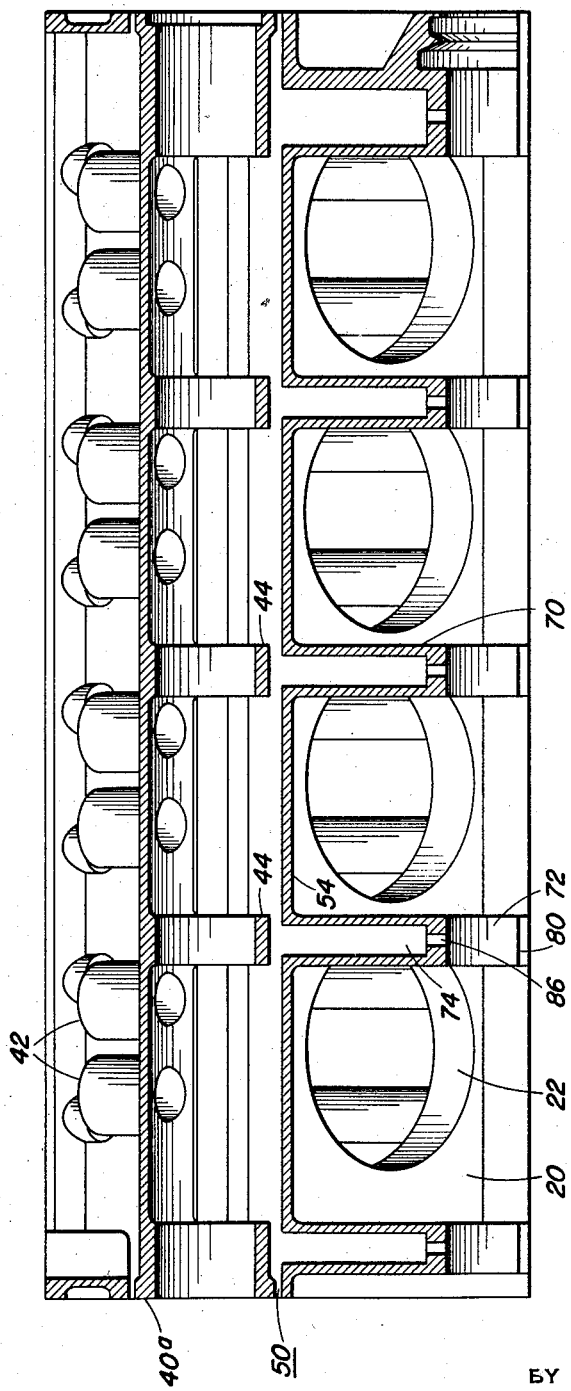
Fig. 8 is a longitudinal section of an engine block similar to Fig. 5 with a modified camshaft housing.
Figure 9:
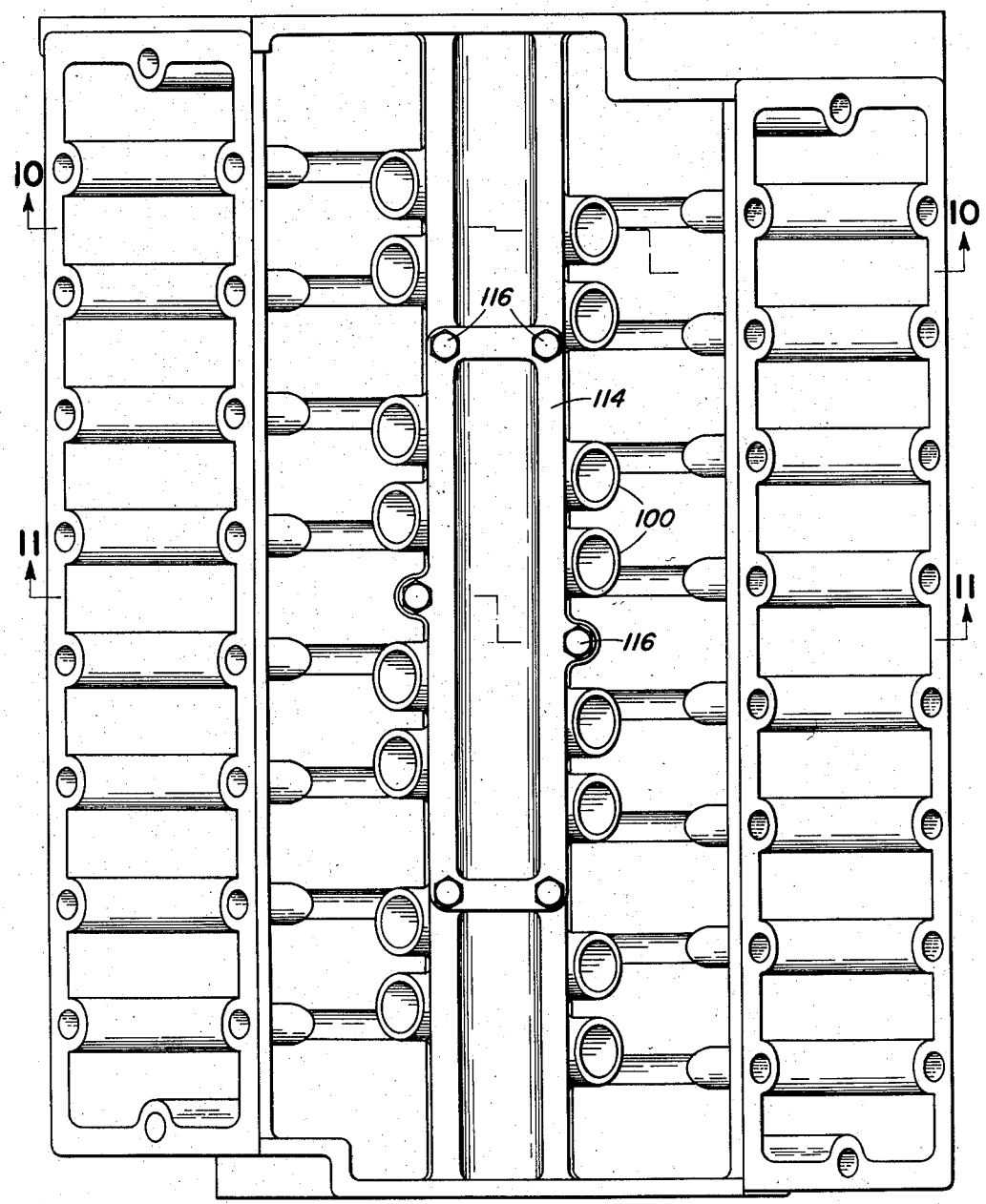
Fig. 9 is a top view of a modified form of the engine block of Fig. 1.
Figure 10:
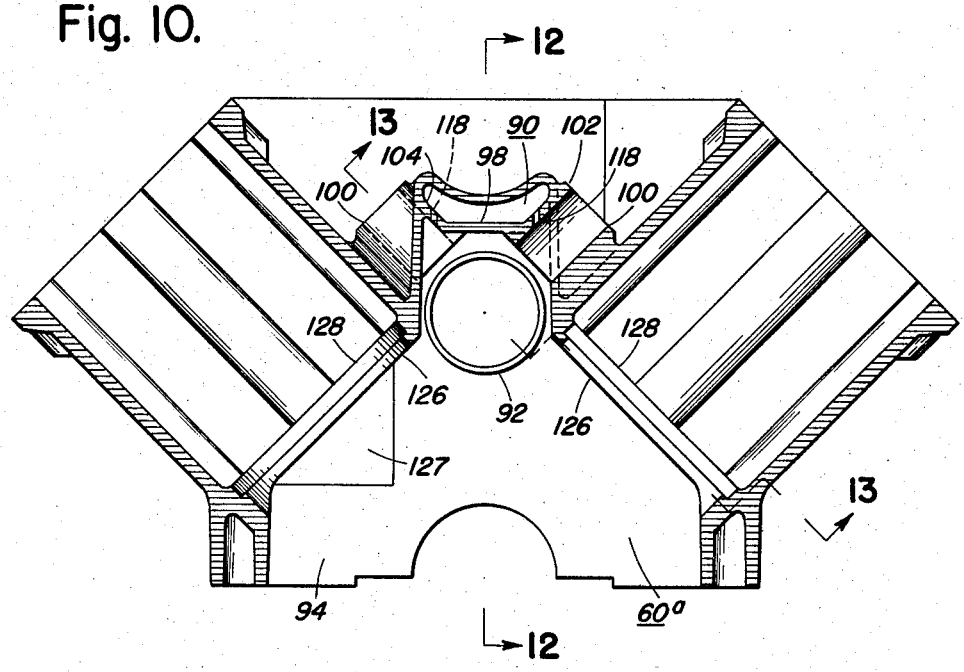
Fig. 10 is a transverse sectional view along the line 10—10 of Fig. 9.
Figure 11:
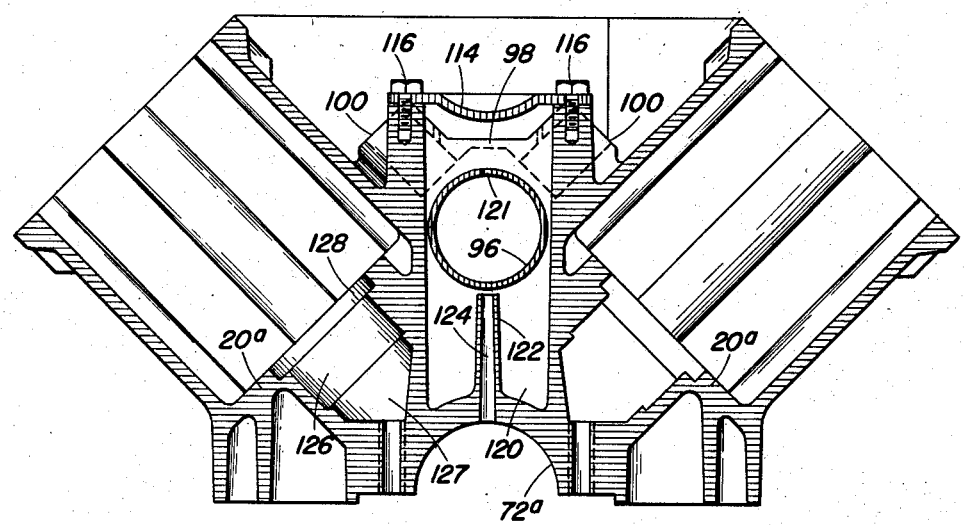
Fig. 11 is a transverse sectional view along the line 11—11 of Fig. 9.
Figure 12:
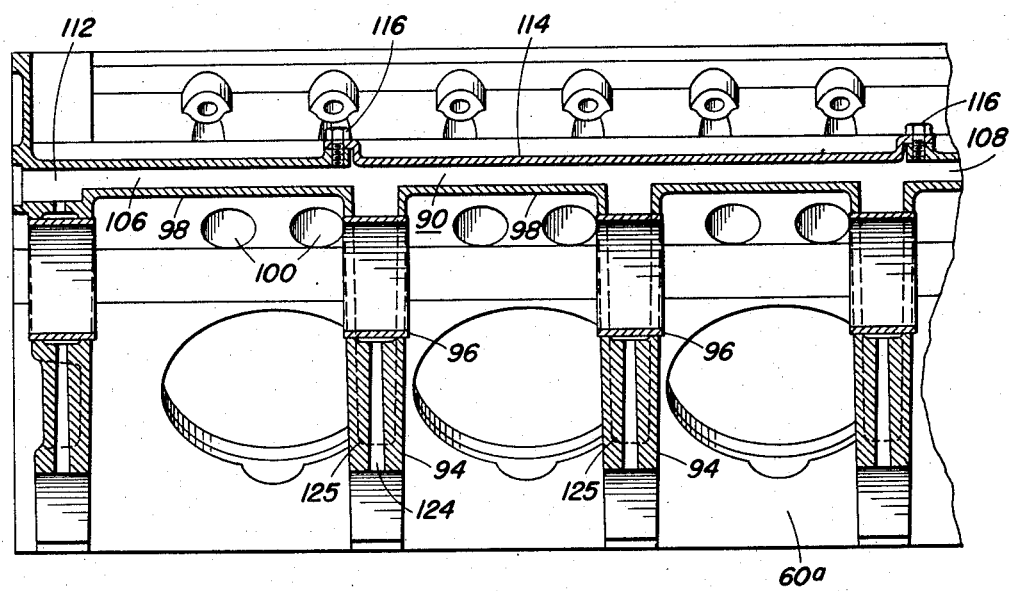
Fig. 12 is a fragmentary longitudinal section taken along the plane 12—12 of Fig. 10.
Figure 13:
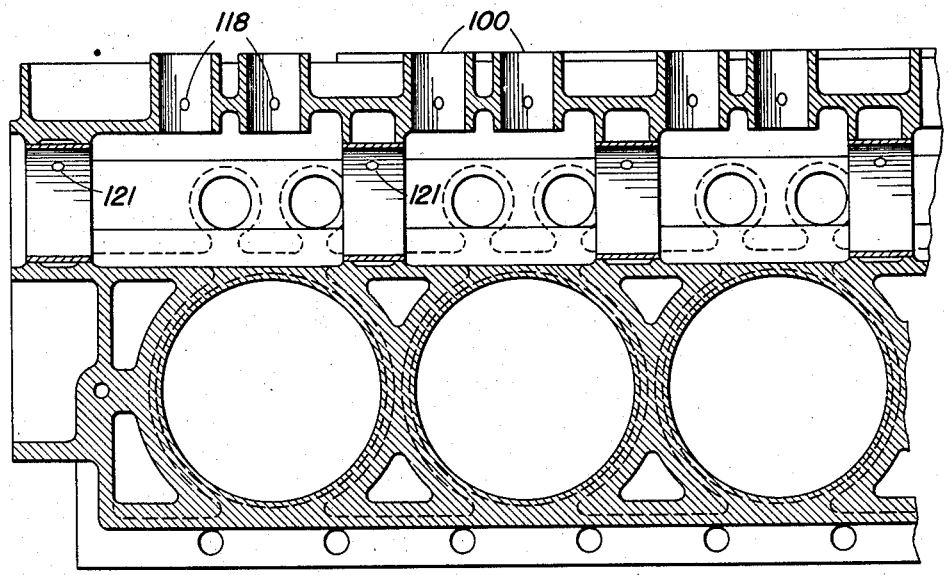
Fig. 13 is a fragmentary section taken along the plane 13—13 of Fig. 10.

The modified camshaft housing 40a of Fig. 8 is open on the underneath side, the top side thereof serving to close the upper side of the oil gallery as before. Continuous cylindrical surfaces are afforded camshaft housing 40a above each of the engine block walls. These cylindrical surfaces 44 support the camshaft and bearing inserts may be cast in place or pressed into place later. In this modification, the oil gallery surrounds the camshaft and the camshaft lobes and the ends of the valve tappets are submerged in oil.

The engine block as shown in Figs. 9–13 is similar to that presented in Figs. 1–7 except that the center distance between camshaft and crankshaft has been shortened. This shortening of the center distance necessitates the positioning of oil gallery 90 above the camshaft bearings 92 and the camshaft, instead of being housed in a separate casting, is located within the engine block casting. Appropriate openings for the camshaft bearings may be provided in the box-frame intermediate walls 94 by means of cores extending through the die. During a subsequent machining operation, these openings may be bored larger, if necessary, or if desired, the walls may be cast solid and the openings bored later, and the camshaft bearing inserts 96 pressed into place.

The crankcase portion 60a is provided with a roof section 98 which also forms the bottom of oil gallery 90. The obliquely disposed valve tappet ports 100 are formed as an integral part of the engine block and the inboard walls 102 of the tappet bosses form a portion of the sidewall for the oil gallery. Web members 104 extend between the various tappet bosses and also between the end bosses and the end walls of the engine block to provide the balance of the gallery sidewall. Oil channels 106 and 108 are formed integrally with the engine block and extend from the end wall to the first intermediate wall. These oil channels are formed by side cores and the portions 112 in the end walls may be of a cylindrical configuration for ease of closing by means of plugs or caps.

The top of the engine block is open above intermediate walls 94 to permit coring to form the box-frame structure of these walls. A separate cover member 114 is attached to this center section, between channels 106 and 108, as by bolts 116 to complete the oil gallery.

Oil holes 118 are provided in the tappet bosses to permit oil from the gallery to lubricate the tappets. The box-frame structure of the intermediate walls provides an oil pocket 120 therein which is in direct communication with the oil gallery. Openings 121 in the camshaft bearing inserts allow lubricant to flow from the oil pocket to the camshaft. Said oil pockets 120 have bosses 122, extending from the crankshaft bearing support 72a to within a short distance of the bottom of the camshaft bearing, which are joined to the front and back walls of the box-frame intermediate wall by webs 125. An oil hole 124 is provided through the center or boss 122 to lubricate the crankshaft bearing. Oil pockets 120, being open to the oil gallery 90, become filled with oil and the upstanding bosses 122 prevent sludge from flowing into the crankshaft bearings.

Figs. 10-13 also present a modification of the cylinder receptors. A cylindrical bore 126 is located in the bottom side of base plate 20a and a concentric bore 128, of larger diameter, is located immediately above it extending to the cylinder gallery. Recesses 127 are formed in the crankcase walls directly below cylinder receptors 126 to furnish clearance for the pistons. The step formed at the junction of the concentric bores provides a positive location for the cylinder sleeve and prevents axial movement of the lower end of said sleeve.

The engine block as shown in Figs. 14 and 15 has the cylindrical walls 23 for the individual cylinders cast as an integral part with the lower ends of the cylinders joined to the two base plates 20b and 20c respectively. The upper ends of the cylinders are not supported from the gallery walls since such a structure would either present undercut portions which could not be cast or would obstruct the circulation of coolant around the cylinders. The coolant chamber 29 would be closed at the top by a deck plate or by the cylinder head using suitable gaskets or sealing material to prevent leakage of the coolant into the cylinders or combustion chambers. In addition to closing the top of the coolant chamber, the deck plate or cylinder head will help support the upper ends of the cylinders.

As may be seen from the various drawings, the provision of cast cylinders as shown in Figs. 14 and 15 or the use of separate cylinder sleeves in conjunction with the cylinder receptors in the base plates of Figs. 1-13 is largely a matter of choice. The selection of either form for the cylinders does not effect the novel features of the hereinbefore described engine block which are: (1) the incorporation of an oil gallery which is cast as part of the engine block and which eliminates the necessity for drilling the customary longitudinal oil holes, and (2) the double-wall construction of the intermediate crankcase walls providing box-frame supports for the crankshaft bearings which furnish the necessary strength and rigidity without the addition of extra weight.

It is anticipated that the engine block may be subject to further modification without departing from the concept of the present invention. The forms of the engine block shown, therefore, are for illustrative purposes only and are not intended to limit the scope of the following claims. It is also to be understood that wherever the term aluminum appears in the following claims, the term aluminum alloy may be substituted therefor without altering the scope.

I claim:

1. A V-type, die cast engine block for an internal combustion engine comprising a pair of obliquely positioned cylinder galleries including inner and outer side walls and end walls provided with means for attaching cylinder heads thereto, a crankcase with side and end walls having intermediate walls disposed transversely between said side walls and an oil gallery, formed by the casting operation, located between the inner walls of said cylinder galleries and extending the length of the engine block, each of said intermediate wall being of generally double-wall construction having solid webs interspersed between the two walls and being provided with a crankshaft bearing support of box-frame construction enclosing an oil pocket extending from said oil gallery to the crankshaft bearing journal, said engine block being characterized by the absence of any undercut portions.

2. An engine block for an internal combustion engine suitable for casting by the process of pressure die casting of light weight metal such as aluminum comprising a pair of obliquely positioned cylinder galleries having inner and outer side walls and end walls, a crankcase having its sides defined by extensions of the outer walls of said cylinder galleries and its top formed by the base plates of said cylinder galleries and the roof member spanning the space between said base plates and an oil gallery located between the inner walls of said cylinder galleries and extending the length of the engine block formed on the underneath side by the roof member of the crankcase and at least a portion of the top thereof formed by a separately cast member, said crankcase being provided with intermediate walls disposed transversely between the said sides, each of said intermediate walls being of generally double-wall construction having solid webs interspersed between the two walls and being provided with a crankshaft bearing support of box-frame construction enclosing an oil pocket extending from said oil gallery to the crankshaft bearing journal, said engine block being characterized by the absence of any undercut portions.

3. A V-type, die cast engine block for an internal combustion engine comprising a pair of cylinder galleries positioned obliquely with respect to a plane extending vertically through said engine block, each of said cylinder galleries including inner and outer side walls, end walls transversely disposed between said side walls and a base plate, a crankcase having side and end walls and being provided with intermediate walls disposed transversely between said side walls, the top of said crankcase being formed by the base plates of said cylinder galleries and a roof member spanning the space between said cylinder galleries and an oil gallery located between the inner walls of said cylinder galleries and extending the length of the engine block, said oil gallery being formed on the underneath side by the roof member of the crankcase and at least a portion of the top being formed by a separately cast member, each of said intermediate walls being of generally double-wall construction and being provided with a crankshaft bearing support of box-frame construction enclosing an oil pocket extending from said oil gallery to the crankshaft bearing journal, said engine block being characterized by the absence of any undercut portions.

4. A V-type, die cast engine block for an internal combustion engine comprising a pair of obliquely positioned cylinder galleries, a separately cast camshaft housing having obliquely extending valve tappet ports, an oil gallery located between the inner walls of said cylinder galleries having the underneath side formed by a web member spanning the space between said cylinder galleries and the top formed by the separately cast camshaft housing, and a crankcase having end and side walls with intermediate walls transversely disposed between said side walls, said intermediate walls being of generally double wall construction having solid webs interspersed between said double walls and being provided with a box-frame crankshaft bearing support enclosing an oil pocket extending from said oil gallery to the crankshaft bearing journal, said engine block being characterized by the absence of any undercut portions.

5. A die cast, V-type engine block for an internal combustion engine comprising a pair of obliquely positioned cylinder galleries, each of said cylinder galleries including side walls, end walls and a base plate, obliquely extending vave tappet ports positioned between said cylinder galleries, a crankcase with side walls and transverse end and intermediate walls, each of said transverse end and intermediate walls being provided with a crankshaft bearing journal and a camshaft bearing journal, the said intermediate walls being of generally double-wall construction and being provided with a crankshaft bearing support of box-frame construction, and an oil gallery extending the length of the engine block, the underneath side of said oil gallery being formed by a web spanning the space between the inner walls of said cylinder galleries and at least a portion of the top being formed by a separately cast member, said oil gallery being in communication with each of said valve tappet ports through oil holes extending therebetween, said engine block being characterized by the absence of any undercut portions.

6. A die cast, V-type engine block for an internal combustion engine comprising a pair of obliquely positioned cylinder galleries, each of said cylinder galleries including side walls, end walls and a base plate provided with cylindrical receptors for the bottom ends of separate cylinder sleeves, a crankcase having transverse, intermediate walls of generally double-wall construction and an oil gallery located between the inner walls of said cylinder galleries and extending the length of the engine block, a portion of said oil gallery being formed by a separately cast member and the balance being formed by said engine block, each of said intermediate walls being provided with a box-frame crankshaft bearing support enclosing an oil pocket extending from said oil gallery to the crankshaft bearing journal, said engine block being characterized by the absence of any undercut portions.

7. A die cast, V-type engine block for an internal combustion engine comprising a pair of obliquely positioned cylinder galleries, each of said cylinder galleries including side walls, end walls, a base plate and cylindrical walls for the individual cylinders, the lower ends of said cylinder walls being cast integrally with said base plate, a crankcase having transverse intermediate walls of generally double-wall construction and an oil gallery extending the length of the engine block, the underneath side of said oil gallery being formed by a web spanning the space between the inner walls of said cylinder galleries and at least a portion of the top being formed by a separately cast member, each of said intermediate walls being provided with a box-frame crankshaft bearing support enclosing an oil pocket extending from said oil gallery to the crankshaft bearing journal, said engine block being characterized by the absence of any undercut portions.

References Cited in the file of this patent
UNITED STATES PATENTS

| | | |
|---|---|---|
| 1,173,105 | Fekete | Feb. 22, 1916 |
| 1,444,279 | Short | Feb. 6, 1923 |
| 2,739,574 | Scheiterlein | Mar. 27, 1956 |
| 2,817,327 | Brenneke | Dec. 24, 1957 |